United States Patent [19]
Mizuno

[11] Patent Number: 5,893,637
[45] Date of Patent: Apr. 13, 1999

[54] ELECTROLUMINESCENT DISPLAY APPARATUS FOR A VEHICLE

[75] Inventor: Toru Mizuno, Nagoya, Japan

[73] Assignee: Nippondenso Co., Ltd., Kariya, Japan

[21] Appl. No.: 08/724,251

[22] Filed: Sep. 30, 1996

[30] Foreign Application Priority Data

Nov. 28, 1995 [JP] Japan ..................... 7-309464

[51] Int. Cl.[6] ........................................ B60Q 3/04
[52] U.S. Cl. ................... 362/489; 362/23; 362/84; 362/85
[58] Field of Search ................. 340/461, 851.47, 340/815.49, 815.5, 815.73, 462, 815.4, 815.42, 815.74; 362/23, 482, 488, 489, 490, 84, 85, 135, 140; 40/542, 544; 345/36, 76

[56] References Cited

U.S. PATENT DOCUMENTS

| | | | |
|---|---|---|---|
| 3,314,178 | 4/1967 | Sayler et al. | 40/544 |
| 3,699,511 | 10/1972 | Fletcher et al. | 362/80.1 |
| 4,225,005 | 9/1980 | Okabayashi | 340/461 |
| 4,418,377 | 11/1983 | Tamura | 362/85 |
| 4,464,933 | 8/1984 | Santis | 340/462 |
| 4,636,782 | 1/1987 | Nakamura et al. | 340/461 |
| 5,013,967 | 5/1991 | Hirotaka et al. | 313/512 |
| 5,181,012 | 1/1993 | Furuya et al. | 340/461 |
| 5,257,167 | 10/1993 | Clem | 362/27 |
| 5,270,682 | 12/1993 | Aoki | 340/461 |
| 5,334,995 | 8/1994 | Iino | 340/461 |
| 5,549,323 | 8/1996 | Davis | 280/728.3 |

FOREIGN PATENT DOCUMENTS 60-003872 1/1985 Japan.
7-027577 1/1995 Japan.

OTHER PUBLICATIONS

Bischoff, "Halbleiter-Anzeigesysteme fur Kraftfahrzeuge", ATZ 77 (Aug. 1975), pp. 218–222.

*Primary Examiner*—Alan Cariaso
*Attorney, Agent, or Firm*—Pillsbury Madison & Sutro LLP

[57] ABSTRACT

A display panel includes a transparent EL panel held at an inner end of an opening formed in an instrument panel portion and inclined at a predetermined acute angle with respect to a viewing direction. A cover is disposed at a back side of the display panel for covering the display panel. A surface of the opening portion and an inner face of the cover, to which light from the display panel enters, are colored dark to absorb unnecessary ambient light.

8 Claims, 4 Drawing Sheets

ELECTROLUMINESCENT DISPLAY APPARATUS FOR A VEHICLE

CROSS REFERENCE TO RELATED APPLICATION

This application is based upon and claims the benefit of priority of the prior Japanese Patent Application No. 7-309464 filed on Nov. 28, 1995, the content of which is incorporated herein by reference.

BACKGROUND OF THE INVENTION

1. Field of the Invention

The present invention relates to a display apparatus, and more particularly, to a display apparatus having an electroluminescent (hereinafter referred to as EL) panel, which is suitable to be equipped in a vehicle.

2. Related Arts

Recently, EL panels have been applied to display apparatuses for vehicles. For example, a display apparatus using an EL panel, which is attached to a windshield of a vehicle at its lower portion, is known by JP-U-60-3872.

In the display apparatus, a passenger in a passenger compartment recognizes display information indicated by the EL panel at the lower portion of the windshield.

SUMMARY OF THE INVENTION

An object of the present invention is to provide an improved vehicle display apparatus which includes a transparent EL panel. More particularly, it is an object of the present invention to provide a vehicle display apparatus capable of providing a clear display of information.

According to the present invention, a vehicle display apparatus includes a transparent display panel disposed in an instrument panel portion of a vehicle so that the display panel is inclined at a predetermined acute angle with respect to a viewing direction of a passenger sitting in a passenger seat of the vehicle. Further, the display panel includes a transparent EL panel.

In this case, when the display panel is not in operation, light incident on the display panel is reflected in directions different from the viewing direction of the passenger. Therefore, ambient light reflected from the display panel is not directed to the eyes of the passenger. Since the display panel is transparent, in the case that the display panel is installed in the dark and not operated as at a vehicle stop, the passenger will not recognize the display panel unnecessarily.

On the other hand, in the case that the EL panel is installed in the dark and operated as in a vehicle running, the passenger can recognize display information indicated by the EL panel as if the display information floats in a space with the ambient light reflected by the display panel not being directed into the eyes of the passenger.

In the case that the instrument panel portion has a front wall facing the passenger seat and forming an opening portion, the display panel is disposed deeply in the opening portion in the viewing direction.

Preferably, an inside surface of the opening portion, where light reflected from the display panel enters, is colored dark, so that the reflected light is absorbed by the inside surface. As a result, the light reflected from the display panel is not directed to the eyes of the passenger.

More preferably, the display apparatus includes a cover disposed at a back side of the display panel for covering the display panel, and its inside surface facing the display panel is colored dark. Therefore, even when luminescent light by the EL panel and transmitted light from the EL panel are incident to the cover, the light is absorbed by the inside surface of the cover.

Moreover, the cover at a back side of the display panel provides a space between the inside surface thereof and the display panel, whereby the display information indicated by the EL panel can be recognize by the passenger with a depth.

BRIEF DESCRIPTION OF THE DRAWINGS

The present invention will become more fully understood from the detailed description given hereinbelow and the accompanying drawings which are given by way of illustration only and are not intended to limit the present invention, and wherein.

DETAILED DESCRIPTION OF THE PRESENTLY PREFERRED EMBODIMENTS

Embodiments according to the present invention will be described hereinunder with reference to the drawings.

Figure 1:
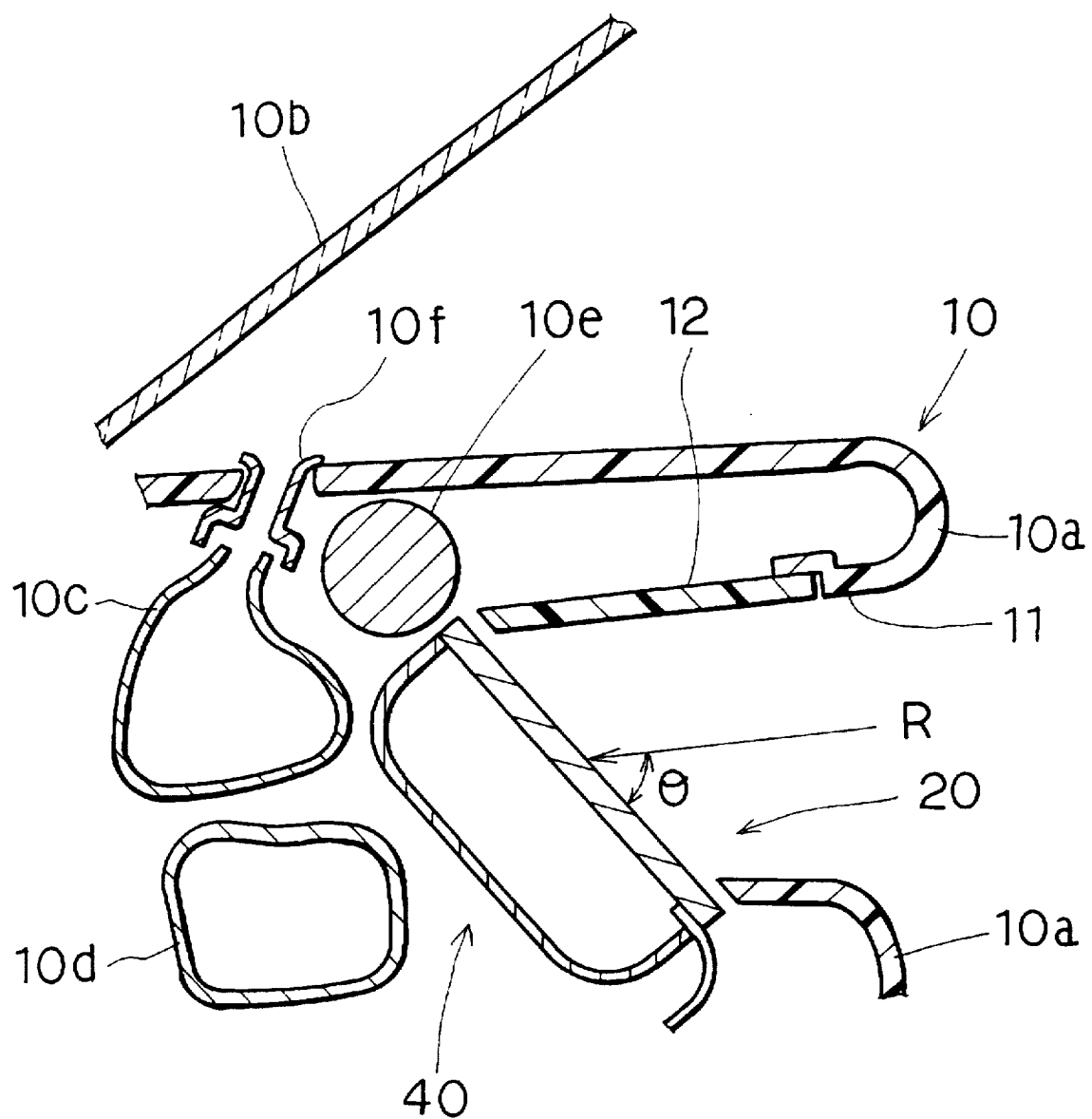
FIG. 1 is a schematic view showing a display apparatus installed in an instrument panel portion according to a first embodiment of the present invention.
Figure 3:
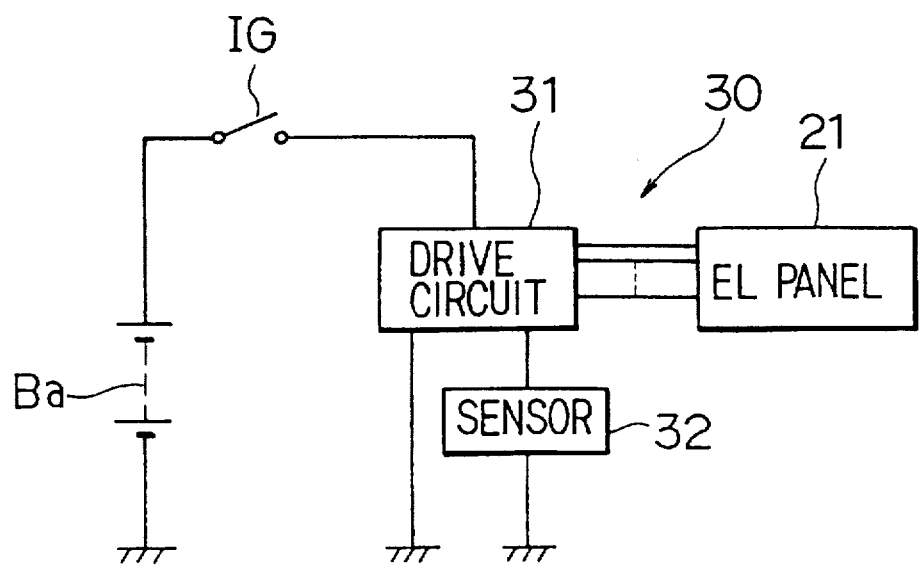
FIG. 3 is an electric circuit diagram for driving the display panel in the first embodiment.

First, a first embodiment will be described with reference to FIGS. 1 and 3 showing a vehicle display apparatus installed in a vehicle. The display apparatus is composed of a display panel 20 installed in an instrument panel portion 10 as shown in FIG. 1, and an electric circuit 30 shown in FIG. 3 for driving the display panel 20.

Figure 2:
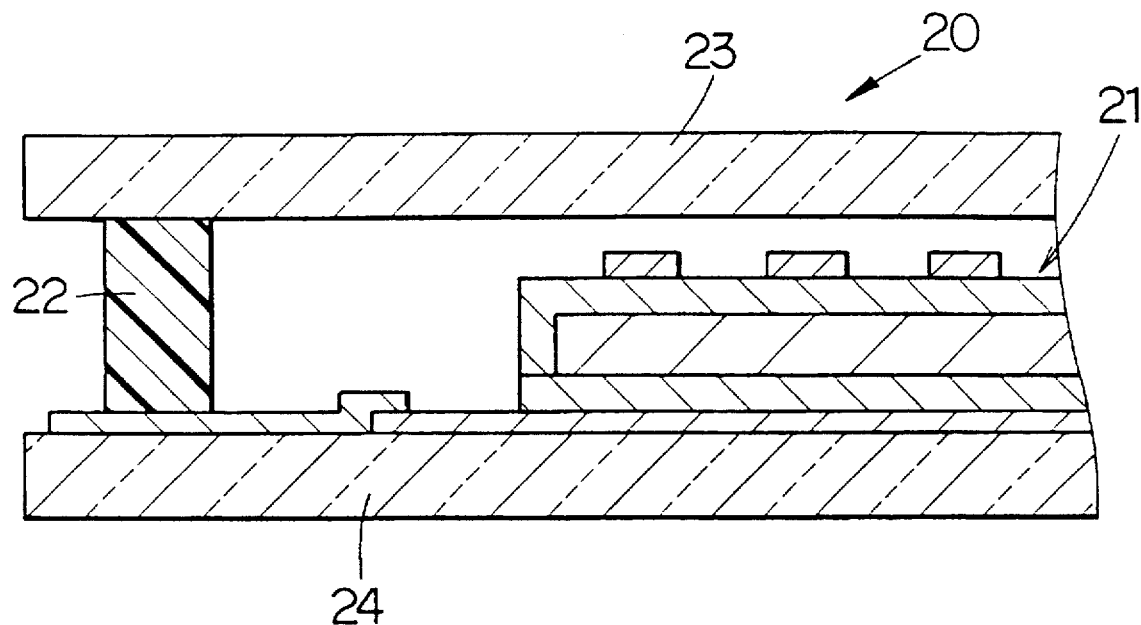
FIG. 2 is an enlarged fragmentary sectional view showing a display panel in the first embodiment.

The instrument panel portion 10 is formed with an opening portion 11 at a front wall 10a thereof, and the display panel 20 is held at an inner end of the opening portion 11 through a connection plate 12. As shown in FIG. 2, the display panel 20 includes transparent substrates 23 and 24 which are overlaid through a seal 22, and a transparent EL panel 21 disposed between the substrates 23 and 24.

The opening portion 11 faces a viewing direction (indicated by an arrow R in FIG. 1) of a driver sitting in a driver's seat so that an axis of the opening portion 11 is generally parallel to the viewing direction.

The connection plate 12 is fixed to the inner end of the opening portion 11 so that the display panel 20 is inclined at a predetermined acute angle θ with respect to the driver's viewing direction R. The predetermined acute angle θ is determined so that ambient light incident on the panel 20 and reflected from a surface of the display panel 20 is not directed to the driver. The connection plate 12 is made of a dark colored resin material to absorb the light reflected from the surface of the display panel 20.

Further, the instrument panel portion 10 is made of a dark colored resin material as well as the connection plate 12. The connection plate 12 may be made of the same material as that of the instrument panel portion 10 and integrated with the opening portion 11.

The display panel 20 also includes a cover 40 which is disposed at a back side periphery portion of the display panel 20 for covering the back side of the display panel 20 to provide a space between an inner surface thereof and the back surface of the display panel 20. The cover 40 is made of resin material such as ABS, PP or the like so that a sectional shape thereof is a U-like shape as shown in FIG. 2. Further, a black type mat coating is applied to the inner surface of the cover 40 to absorb transmitted light and luminescent light from the display panel 20. In FIG. 1, a windshield, air conditioner ducts, an electric cable and an air conditioner air outlet are respectively indicated by 10b, 10c and 10d, 10e and 10f.

The electric circuit 30, as illustrated in FIG. 3, includes a drive circuit 31 which is supplied electricity from a battery Ba through an ignition switch IG, thereby driving the EL panel 21 in response to an output signal of a sensor 32 for detecting vehicle conditions to be displayed. The electric circuit 30 is mounted on the back side of the cover 40 or the like.

Figure 4:
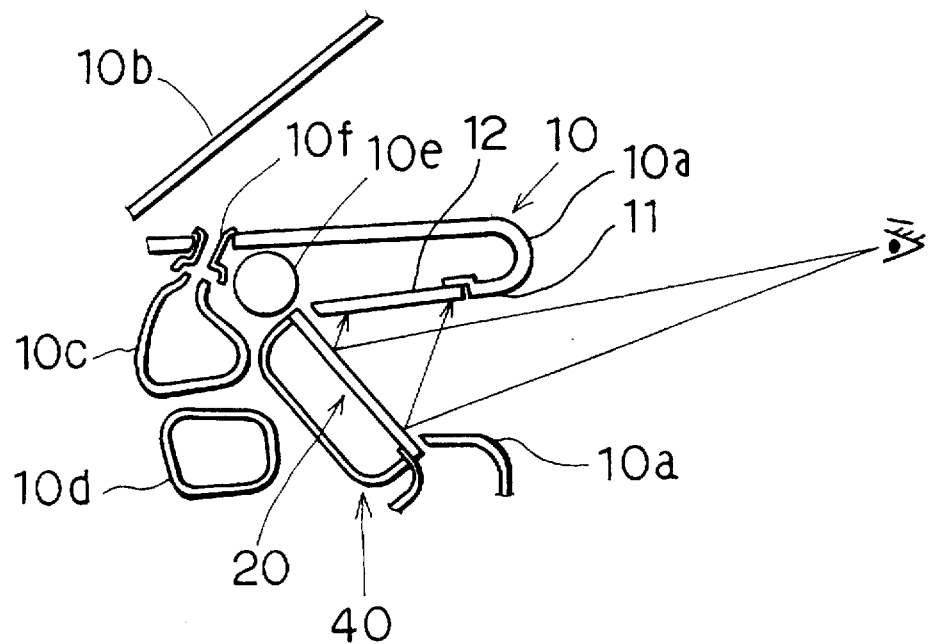
FIG. 4 is a schematic view showing light reflection routes in the first embodiment.

Next, operation of the embodiment will be described. Since, the display panel 20 is inclined at the predetermined acute angle $\theta$ with respect to the driver's viewing direction R, the ambient light which is incident to the surface of the display panel 20 is reflected toward the connection plate 12 as shown in FIG. 4. Further, the reflected light is absorbed in the connection plate 12 owing to the dark color of the connection plate 12.

Therefore, the light reflected from the surface of the display panel 20 does not enter the driver's eyes, whereby reflections of any images of articles in the vehicle including a face of the driver and the like are not directed to the driver. Further, since transmitted light, light not reflected but passing through, from the display panel 20 is also absorbed by the cover 40, the transmitted light does not transmit through the display panel 20 again toward the driver.

Accordingly, as long as the EL panel 21 is not operated, as the display panel 20 is transparent, the driver will not recognize the existence of the display panel 20 unnecessarily. This is, the driver feels as if the display panel 20 does not exist at all.

On the other hand, when the ignition switch IG is turned on so that the drive circuit 31 drives the EL panel 21, the display panel 20 indicates display information in response to the output from the sensor 32.

In this case, even when the EL panel 21 emits light corresponding to the display information, the luminescent light directed toward the cover 40 is absorbed by the mat coating applied to the inner surface of the cover 40. Therefore, the light is not reflected at the cover 40 and does not pass through the display panel 20. Moreover, light reflected from the display panel 20 is absorbed by the connection plate 12 as mentioned above.

Therefore, the driver can see the display information indicated by the display panel 20 without being interfered with by the reflection images and in a state where the driver will not recognize the display panel 20 as mentioned above. Further, there is the provided space between the display panel 20 and the cover 40 in the viewing direction. Consequently, when the driver turns his eyes to the opening portion 11 of the instrument panel portion 10, the driver can recognize the display information with a depth. That is, the display information is recognized by the driver as if the display information is floating on a dark background.

In this case, since the display panel 20 is surrounded by black-type parts, despite brightness of the environment which changes with the daytime, the night time, fine weather, snowy roads or the like, brightness surrounding the display panel 20 does not change so much. As a result, even when luminance of the display panel 20 is lowered, the display information can be recognized with enough luminance and contrast. Therefore, it is not necessary that the display panel 20 be modulated in response to the brightness of the environment.

Next, a second embodiment of the present invention will be described with reference to FIG. 5.

Figure 5:
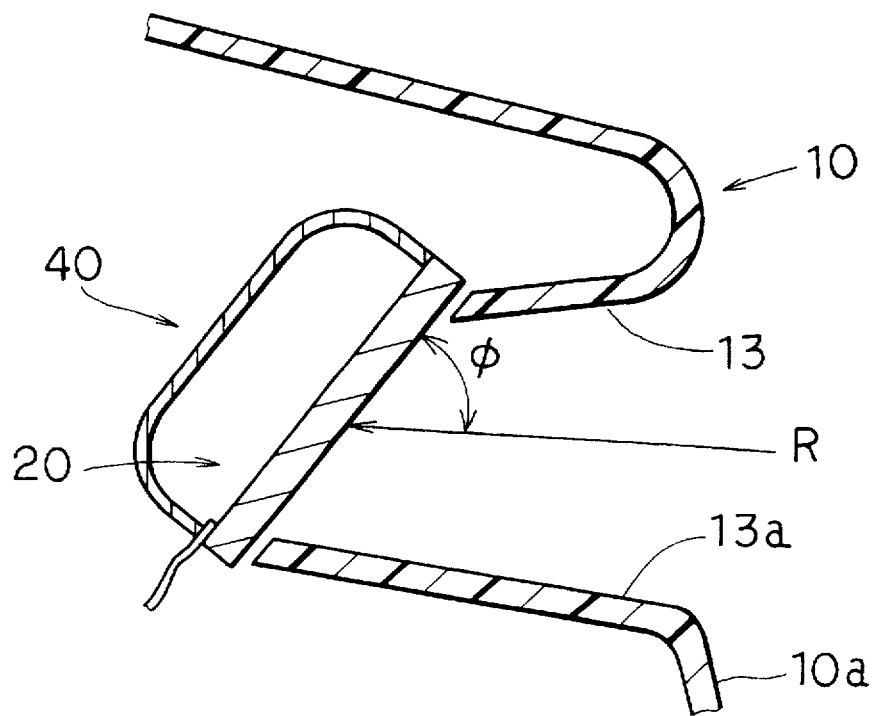
FIG. 5 is a schematic view showing a display apparatus installed in an instrument panel portion according to a second embodiment.

In the second embodiment, in place of the opening portion 11 of the instrument panel portion 10 in the first embodiment, an opening portion 13 whose sectional shape is as shown in FIG. 5 is adopted. Further, the connection plate 12 in the first embodiment is not used, and the display panel 20 is disposed directly at an inner end portion of the opening portion 13 to be inclined at a predetermined acute angle $\phi$ (=the predetermined acute angle $\theta$) with respect to the driver's viewing direction. The other structural features are the same as those in the first embodiment and designated by the same reference numbers.

Figure 6:
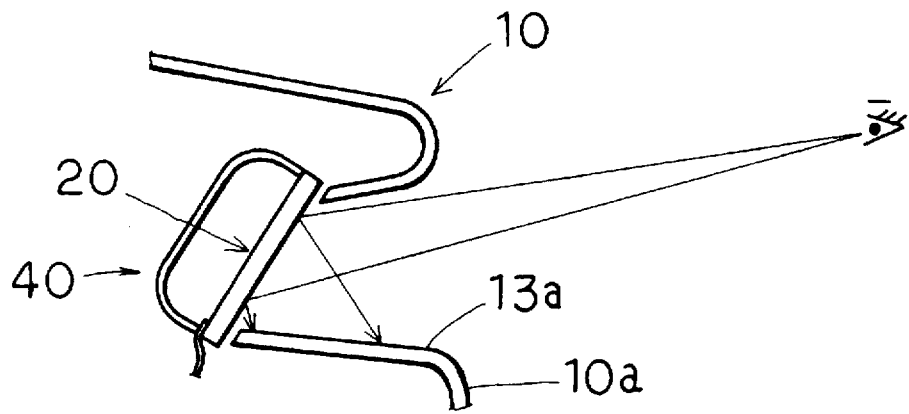
FIG. 6 is a schematic view showing light reflection routes in the second embodiment.

In this embodiment, since the display panel 20 is inclined at the predetermined acute angle $\phi$ with respect to the driver's viewing direction, ambient light incident to the surface of the display panel 20 is reflected toward a lower side inner wall 13a of the opening portion 13 as shown in FIG. 6. The opening portion 13 is colored dark, whereby the light which reflects toward the inner wall 13a is absorbed there. As a result, the same effects as those in the first embodiment can be attained.

Next, a third embodiment of the present invention will be described with reference to FIG. 7.

In the third embodiment, a display panel 20A is adopted instead of the display panel 20 in the first and the second embodiments.

Figure 7:
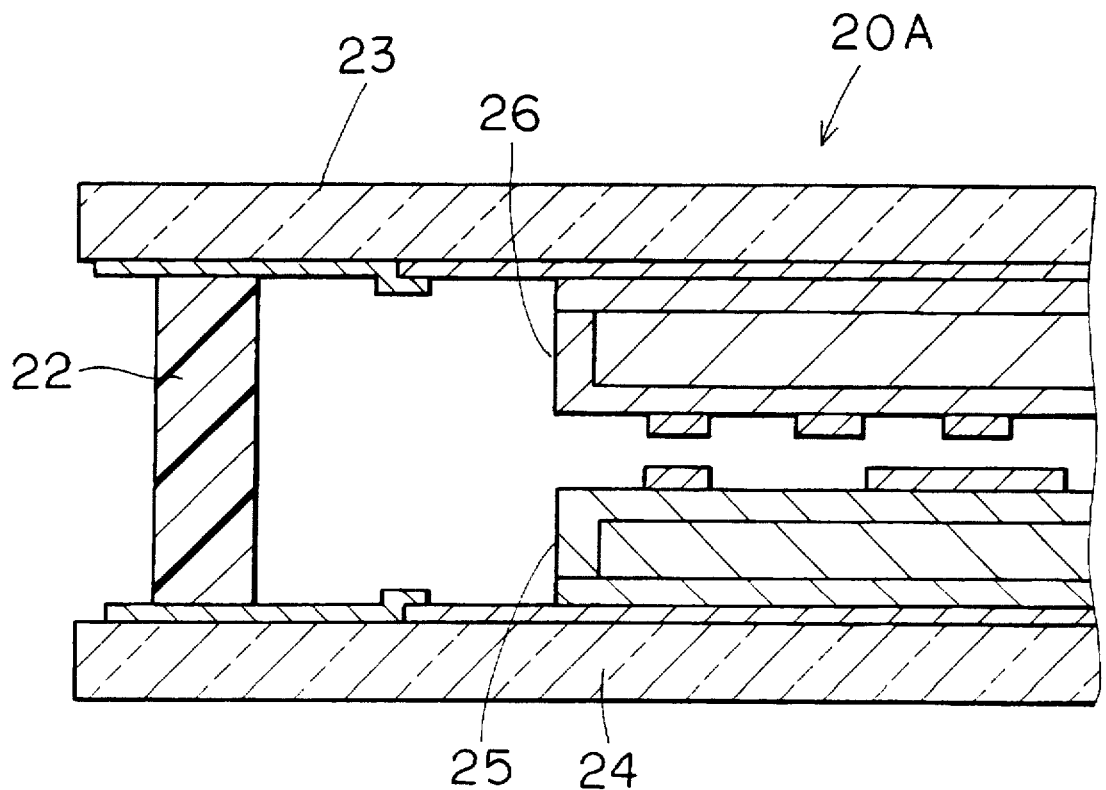
FIG. 7 is an enlarged fragmentary sectional view showing a display panel of a third embodiment.

The display panel 20A has a pair of transparent EL panels 25 and 26, in place of the single EL panel 21, between the transparent substrates 23 and 24 through the seal 22 as shown in FIG. 7. The EL panel 25 has a luminescent layer which produces orange light, for example, while the EL panel 26 has a luminescent layer which produces green light, for example.

Consequently, the display panel 20A can perform trichromatic specification by combinations of luminescent colors produced by the EL panels 25 and 26, while the same effects as those in the foregoing embodiments can be attained in other respects.

In the present invention, the display information indicated by the display panel 20 or 20A is not limitative, and may be an amount of remaining fuel, warnings, running direction of the vehicle, various messages or the like. Further, the display panel 20 or 20A may be a matrix type, a segment type or the like.

Although in the foregoing embodiments the display panel 20 is held at the inner end of the opening portion 11 through the connection plate 12, the connection plate 12 need not be provided. In this case, the display panel is fixed to the same position as in the foregoing embodiments so that light reflected from the display panel 20 enters an under surface of the instrument panel portion 10, whereby the reflected light is not directed to the eyes of the driver.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A display apparatus for a vehicle said vehicle having a passenger seat and an instrument panel portion, said display apparatus comprising:

a transparent display panel disposed in said instrument panel portion with a front surface thereof being inclined at a predetermined acute angle with respect to a viewing direction from said passenger seat, wherein said front surface of said transparent panel reflects light toward said instrument panel portion;

a transparent electroluminescent panel disposed in said display panel; and a cover disposed at a back side of said display panel for covering said back side of said display panel, an inside surface of said cover facing said display panel being a dark color, wherein said cover provides a space between said inside surface thereof and said display panel.

2. A display apparatus for a vehicle according to claim 1, wherein said instrument panel portion has a front wall facing said passenger seat and forms an opening portion extending in said viewing direction, and said transparent display panel is disposed deeply in said opening portion in said viewing direction.

3. A display apparatus for a vehicle according to claim 2, wherein an inside surface of said opening portion is a dark color, said inside surface receiving reflected light from said display panel.

4. A display apparatus for a vehicle according to claim 1, further comprising:

a battery for driving said transparent electroluminescent panel; and an ignition switch disposed between said battery and said transparent electroluminescent panel for controlling electricity from said battery to said transparent electroluminescent panel.

5. A display apparatus for a vehicle, said vehicle having a front windshield and a compartment, said display apparatus comprising:

an instrument panel portion disposed below said windshield in said compartment, said instrument panel portion having a wall portion defining an opening extending along a viewing direction from said compartment, said wall portion being a dark color;

a transparent electroluminescent display positioned in said opening and in a direction away from said compartment for displaying information toward said compartment, said display being inclined relative to said viewing direction from said compartment, wherein said transparent electroluminescent display reflects light incident from said compartment toward said wall portion; and a cover positioned behind said display from said compartment which defines a space with said transparent electroluminescent display and having a dark color that absorbs light incident thereto through and from said transparent electroluminescent display.

6. A display apparatus for a vehicle, said vehicle having a passenger seat and an instrument panel portion, said display apparatus comprising:

a transparent display panel disposed in said instrument panel portion with a front surface thereof being inclined at a predetermined acute angle with respect to a viewing direction from said passenger seat;

a transparent electroluminescent panel disposed in said display panel; and a cover disposed at a back side of said display panel to provide a space having a depth between an inside surface thereof and said display panel, wherein said inside surface of said cover is a dark color.

7. A display apparatus for a vehicle according to claim 6, wherein said instrument panel portion has a front wall facing said passenger seat and defines an opening portion extending in a direction of said viewing direction, and said display panel is disposed deeply in said opening portion in said viewing direction.

8. A display apparatus for a vehicle according to claim 7, wherein an inside surface of said opening portion is a dark color, said inside surface receiving reflected light from said display panel.

* * * * *